(12) United States Patent
Tetlow et al.

(10) Patent No.: US 8,327,668 B2
(45) Date of Patent: Dec. 11, 2012

(54) GRAVITY BENDING GLASS SHEETS

(75) Inventors: Ian Nicholas Tetlow, Tarleton (GB); Luiz Roberto De Jesus, São Paulo (BR)

(73) Assignees: Pilkington Group Limited, Merseyside (GB); Pilkington Brasil LTDA, Cacapava, Sao Paulo (BR)

( * ) Notice: Subject to any disclaimer, the term of this patent is extended or adjusted under 35 U.S.C. 154(b) by 250 days.

(21) Appl. No.: 12/517,491

(22) PCT Filed: Nov. 27, 2007

(86) PCT No.: PCT/GB2007/050721
§ 371 (c)(1),
(2), (4) Date: Jun. 3, 2009

(87) PCT Pub. No.: WO2008/068526
PCT Pub. Date: Jun. 12, 2008

(65) Prior Publication Data
US 2010/0064730 A1    Mar. 18, 2010

(30) Foreign Application Priority Data
Dec. 4, 2006 (GB) .................................. 0624192.1

(51) Int. Cl.
*C03B 23/025* (2006.01)
*C03B 23/027* (2006.01)
(52) U.S. Cl. ............................... 65/289; 65/290; 65/107
(58) Field of Classification Search .................... 65/106, 65/107, 289, 290
See application file for complete search history.

(56) References Cited

U.S. PATENT DOCUMENTS
2,925,688 A    2/1960    Carson
(Continued)

FOREIGN PATENT DOCUMENTS
EP    0 448 447 B1    9/1991
(Continued)

OTHER PUBLICATIONS
International Search Report (Form PCT/ISA/210) for PCT/GB2007/050721 dated Feb. 19, 2008.
(Continued)

*Primary Examiner* — Matthew Daniels
*Assistant Examiner* — Cynthia Szewczyk
(74) *Attorney, Agent, or Firm* — Buchanan Ingersoll & Rooney PC (57) ABSTRACT

A gravity bending mold for bending glass sheets, the gravity bending mold comprising a peripheral shaping rail, the peripheral shaping rail having at least one end section, and at least one auxiliary rail mounted on the peripheral shaping rail, the or each auxiliary rail being respectively mounted adjacent to at least a portion of a respective end section by at least one mount that is adapted to permit relative vertical movement of the auxiliary rail with respect to the respective end section, a tripping mechanism for selectively and temporarily disposing the auxiliary rail in a raised position with respect to the respective end section, and a latch mechanism connected to the tripping mechanism, the latch mechanism being adapted to be engaged by an external actuator to cause relative vertical movement of the auxiliary rail with respect to the respective end section, by operation of the tripping mechanism, so that the auxiliary rail is subsequently disposed in a lowered position with respect to the respective end section. There is also provided a method of bending glass sheets using such a mold.

21 Claims, 8 Drawing Sheets

U.S. PATENT DOCUMENTS

| | | | |
|---|---|---|---|
| 3,235,350 A | 2/1966 | Richardson | |
| 5,167,689 A | 12/1992 | Weber | |
| 5,660,609 A | 8/1997 | Muller et al. | |
| 5,893,941 A | 4/1999 | Nikander | |
| 6,006,549 A | 12/1999 | Savka et al. | |
| 6,076,373 A | 6/2000 | Grodziski | |
| 6,357,263 B1 | 3/2002 | Yajima et al. | |
| 6,629,436 B1 * | 10/2003 | Skeen et al. | 65/107 |
| 6,705,116 B2 | 3/2004 | Matsuo et al. | |

FOREIGN PATENT DOCUMENTS

| | | | |
|---|---|---|---|
| EP | 0 640 569 B1 | 3/1995 | |
| EP | 0885851 A2 | 12/1998 | |
| EP | 0 705 798 B1 | 3/2000 | |
| EP | 0 982 271 A1 | 3/2000 | |
| EP | 0 788 466 B1 | 7/2000 | |
| EP | 1 140 712 B1 | 12/2002 | |
| EP | 1 626 939 | 12/2004 | |
| EP | 1 380 547 B1 | 8/2005 | |
| FR | 2894955 A1 | 6/2007 | |
| JP | 2002-241140 A | 8/2002 | |

OTHER PUBLICATIONS

Search Report issued Oct. 31, 2007 in corresponding UK Application No. GB0624192.1.

* cited by examiner

GRAVITY BENDING GLASS SHEETS

The present invention relates to a gravity bending mould, and to an apparatus for, and a method of, gravity bending glass sheets. In particular the present invention relates to gravity bending of glass sheets, otherwise known as sag bending, in which the glass sheets are supported on a bending mould while being conveyed through a heating lehr of a glass bending furnace.

It is well known to subject glass sheets to gravity bending to shape the glass sheets for forming vehicle windows, for example automotive windows. A single glass sheet may be bent on the gravity bending mould, or two glass sheets may be bent as a stack on the gravity bending mould when the glass sheets are subsequently to be laminated together to form a laminated windscreen. Many modern automotive windows require a high degree of bending curvature at one or more edges or corners. When such a large curvature is introduced into the glass sheet or sheets, this can cause visible imperfections to be introduced into the glass sheets, reducing the optical quality of the glass sheets. Also, it may be difficult to control the bending operation consistently. Furthermore, for some applications there is a need to have a high degree of surface control so that the curved glass surface better matches the design surface. This may also ensure compatibility of a windscreen with existing windscreen wiper systems.

Furthermore, although it is possible to achieve the high degree of curvature using additional forces other than gravity, such as by using a press bending die adapted to press downwardly on the upper surface of the glass sheets, it is desirable to achieve the desired curvature by using only the force of gravity acting on the glass sheets as they soften and are caused to sag to the desired shape defined by the moulds as the sheets pass through the furnace lehr. This is because if an additional press bending die is used then the upper surface of the glass sheet is contacted during the bending operation, which may lead to a reduction in the surface quality of the glass sheets as a result of inadvertent marking of the upper surface by the die, and also the equipment costs are increased. In addition the production rate can be increased by using solely gravity bending as compared to using an additional press bending step.

Two types of conventional gravity bending moulds for bending one or more glass sheets to form vehicle windows are known.

In a first type, the gravity bending mould is a fixed mould having a peripheral rim which supports the glass sheet or sheets along a peripheral edge of the lower glass surface. The peripheral rim forms the desired bent shape of the glass sheets.

Initially, the glass sheet or sheets are placed on the bending mould, whereby the glass sheet or sheets are supported, generally horizontally, by the highest portions of the peripheral rim. The assembly of the glass sheet or sheets on the gravity bending mould is then passed through a heating lehr. As the glass heats it softens and progressively sags downwardly under gravity until the glass sheet or sheets are supported around their entire periphery by the peripheral rim.

Such a fixed gravity bending mould is generally used for introducing relatively low curvature into the glass sheet or sheets. It is generally used for vehicle side windows.

In a second type, the gravity bending mould is articulated. On a conventional articulated gravity bending mould for bending one or more glass sheets to form a vehicle windscreen, a central portion of the bending mould is static, and two articulated wings are mounted at opposite ends of the central portion. The central portion and the two articulated wings define a peripheral rim which supports the glass sheet or sheets along a peripheral edge of the lower glass surface. The wings are connected to counterweights which apply a rotational force to the wings, tending to rotate the wings upwardly, each about a respective pivot axis, from a substantially horizontal open initial position to a closed bent position in which the rim forms the desired bent shape of the glass sheets.

Initially, the wings are pushed downwardly to the substantially horizontal open initial position and the glass sheet or sheets are placed on the bending mould, whereby the glass sheet or sheets are supported horizontally by the portions of the peripheral rim in the wings. The assembly of the glass sheet or sheets on the gravity bending mould is then passed through a heating lehr. As the glass heats it softens and progressively sags downwardly under gravity, permitting the articulated wings progressively to be rotated upwardly about their respective pivot axes under action of the counterweights, thereby to close the mould. In the final fully closed position, the glass sheet or sheets are supported around their entire periphery by the both the portions of the peripheral rim in the wings and by the portions of the peripheral rim in the central portion.

Such an articulated gravity bending mould is generally used for introducing relatively high curvature into the glass sheet or sheets. It is generally used for vehicle windscreens.

Sometimes a high degree of curvature is desired to be introduced into the edges or corners of the glass sheets. It is known to employ an auxiliary rim provided adjacent to the rim in the articulated wing. The auxiliary rim is either mounted on the articulated wing, or is part of an auxiliary wing which is mounted to a support for the central portion.

For example, EP-A-0885851 discloses an articulated gravity bending mould incorporating such an auxiliary rim. The auxiliary rim is located at an end of the mould and is released during the bending operation. The auxiliary rim has a larger radius of curvature than the adjacent end rail, thereby causing a small amount of cross curvature to be introduced initially and then a greater amount of cross curvature to be introduced subsequently. These two bending steps overlap in time so as to provide a transition phase between the two bending steps in which longitudinal and cross bending are simultaneously introduced. This is at least partly because the auxiliary rails are caused to drop by an internal actuation, which requires continued dynamic motion of the wings during longitudinal bending to initiate the commencement of cross curvature by dropping of the auxiliary rails. This provides the technical problem that the bending operation can be difficult to control accurately. This in turn can cause quality control problems with regard to the curvature and optical properties of the glass sheets meeting the required specification. Also, the mould is relatively complicated in structure.

U.S. Pat. No. 3,235,350 discloses a gravity bending mould incorporating a pair of adjacent wing portions at each end of the central portion a gravity bending mould. The first wing portion operates in an initial bending operation and then the second wing portion takes over to complete the bending operation. This mould is complicated and not suitable for making modern vehicle windscreens of high curvature in regions located at the ends or edges of the glass sheets.

The present invention aims at least partially to overcome these problems of these known gravity bending moulds.

In recent years, some automobiles have incorporated panoramic or moon roofs into the vehicle design. These comprise a single piece of glazing, toughened or laminated, that extends over substantially the entire roof of the automobile, and therefore is required to be shaped so as to be smoothly blended into the bodywork of the vehicle. The panoramic or moon roof typically has a relatively low degree of both longitudinal and cross curvature, except at its corners, most typically its front corners which are required to be fitted to the upper corners of the vehicle windscreen.

These high curvature front corners are difficult to bend accurately. One problem is that during the glass shaping process, for example using a gravity bending mould, flat parts or even inverse curvature can be formed inboard of the edge of the high curvature portions. Since the peripheral edges of a panoramic or moon roof are provided with an obscuration band, these edges are not transmitting to visible light, but rather are reflective. Such reflective properties tend to enhance the negative visual impact of incorrect curvature at the peripheral edges. Also, the most curved parts of a panoramic or moon roof, being located above the upper corners of the windscreen, are highly visible, being approximately at eye level and highly exposed to light. This also exacerbates any negative visual impact of any incorrectly shaped glazing in those regions. In contrast, for a vehicle windscreen the highly curved corners are typically the lower corners that are usually at least partly obscured by the vehicle bodywork.

The present invention aims at least partially to overcome these problems of known panoramic or moon roofs, and aims to provide an improved panoramic or moon roof, in particular produced using a gravity bending mould.

Accordingly, the present invention provides a gravity bending mould for bending glass sheets, the gravity bending mould comprising a peripheral shaping rail, the peripheral shaping rail having at least one end section, and at least one auxiliary rail mounted on the peripheral shaping rail, the or each auxiliary rail being respectively mounted adjacent to at least a portion of a respective end section by at least one mount that is adapted to permit relative vertical movement of the auxiliary rail with respect to the respective end section, a tripping mechanism for selectively and temporarily disposing the auxiliary rail in a raised position with respect to the respective end section, and a latch mechanism connected to the tripping mechanism, the latch mechanism being adapted to be engaged by an external actuator to cause relative vertical movement of the auxiliary rail with respect to the respective end section, by operation of the tripping mechanism, so that the auxiliary rail is subsequently disposed in a lowered position with respect to the respective end section.

The present invention also provides a glass sheet bending apparatus, the apparatus comprising a plurality of gravity bending moulds according to the present invention, a furnace, and a conveyor system for successively conveying the plurality of gravity bending moulds through the furnace, the furnace including at least one latch actuator mechanism provided in the furnace at a predetermined location along the furnace length, the latch actuator mechanism being adapted to operate the latch mechanism as each respective gravity bending mould is conveyed past the latch actuator mechanism.

The present invention further provides a method of gravity bending glass sheets, the method comprising the steps of;
(a) providing a gravity bending mould comprising a peripheral shaping rail, the peripheral shaping rail having at least one end section;
(b) placing at least one flat glass sheet on the gravity bending mould; and
(c) gravity bending the at least one flat glass sheet in a furnace by heating the at least one glass sheet during conveyance through the furnace, the heating causing softening of the at least one glass sheet thereby to gravity bend the at least one glass sheet onto the peripheral shaping rail to a final position corresponding to the desired bent shape of the at least one glass sheet, the gravity bending comprising two phases, (i) a first phase in which substantially all of the longitudinal curvature is introduced by gravity bending the at least one glass sheet and at least one lateral edge of the at least one glass sheet is supported and substantially prevented from developing a cross curvature by gravity bending; and
(ii) a second phase, after the first phase, in which the at least one lateral edge of the at least one glass sheet is permitted to develop a final cross curvature by gravity bending.

The present invention also provides a gravity bending mould for bending glass sheets for the manufacture of panoramic roofs for automobiles, the gravity bending mould comprising a peripheral fixed shaping rail, the shaping rail having at least one corner, and at least one auxiliary rail mounted on the peripheral fixed shaping rail, the or each auxiliary rail being respectively mounted adjacent to at least a portion of a respective corner by at least one mount that is adapted to permit relative vertical movement of the auxiliary rail with respect to the respective corner, a tripping mechanism for selectively and temporarily disposing the auxiliary rail in a raised position with respect to the respective corner, and a latch mechanism connected to the tripping mechanism, the latch mechanism being adapted to be engaged by an external actuator to cause relative vertical movement of the auxiliary rail with respect to the respective corner, by operation of the tripping mechanism, so that the auxiliary rail is subsequently disposed in a lowered position with respect to the respective corner.

The present invention yet further provides a method of gravity bending glass sheets for the manufacture of panoramic roofs for automobiles, the method comprising the steps of;
(a) providing a gravity bending mould comprising a peripheral fixed shaping rail, the shaping rail having at least one corner, and at least one auxiliary rail mounted on the peripheral fixed shaping rail, the or each auxiliary rail being respectively mounted adjacent to at least a portion of a respective corner by at least one mount that is adapted to permit movement of the auxiliary rail with respect to the respective corner between a raised position and a lowered position with respect to the respective corner;
(b) placing at least one flat glass sheet on the gravity bending mould with the or each auxiliary rail being in the raised position; and
(c) gravity bending the at least one flat glass sheet in a furnace by heating the at least one glass sheet during conveyance through the furnace, the heating causing softening of the at least one glass sheet thereby to gravity bend the at least one glass sheet so that the peripheral edge of the at least one glass sheet sags downwardly into contact with the peripheral fixed shaping rail corresponding to the final bent shape of the at least one glass sheet, the gravity bending comprising two phases,
(i) a first phase in which the or each auxiliary rail is in the raised position and the curvature of the final bent shape, apart from at the or each corner having an auxiliary rail, is introduced by gravity bending the at least one glass sheet into contact with the peripheral fixed shaping rail and the or each auxiliary rail; and
(ii) a second phase, after the first phase, in which the or each auxiliary rail is in the lowered position and all of the curvature of the final bent shape is completed by gravity bending the at least one glass sheet into contact with the peripheral fixed shaping rail around its entire periphery.

Embodiments of the present invention will now be described by way of example only with reference to the accompanying drawings, in which.

Referring to the drawings, there is shown a gravity bending mould 2 for bending glass sheets in accordance with an embodiment of the present invention. The gravity bending mould 2 comprises a central portion 4 and two wing portions 6, 8. The central portion 4 of the gravity bending mould 2 is mounted on a support 10. The central portion 4 has two opposed side shaping or bending rails 11, 12 that are substantially parallel, substantially horizontal and static with respect to the support 10. One side bending rail 11 is configured to shape an upper longitudinal edge of a vehicle windscreen and the other side bending rail 12 is configured to shape a lower longitudinal edge of the vehicle windscreen.

In the illustrated embodiment, an articulated gravity bending mould is employed. However, the present invention may alternatively employ a fixed ring (i.e. a non-articulated) gravity bending mould. This has a single fixed peripheral bending rail.

The wing portions 6, 8 are articulated and are mounted at opposite ends of the central portion 4. Each wing portion 6,8 has a respective shaping or bending rail 14,16 which is substantially U-shaped, and includes an end section 18 and two side sections 20, 22. The end section 18 is configured to shape a respective lateral transverse edge of the vehicle windscreen by a curved upper shaping surface 19 and the two side sections 20, 22 are configured to shape longitudinal end portions of, respectively, the upper and lower longitudinal edges of the vehicle windscreen.

Figure 3:
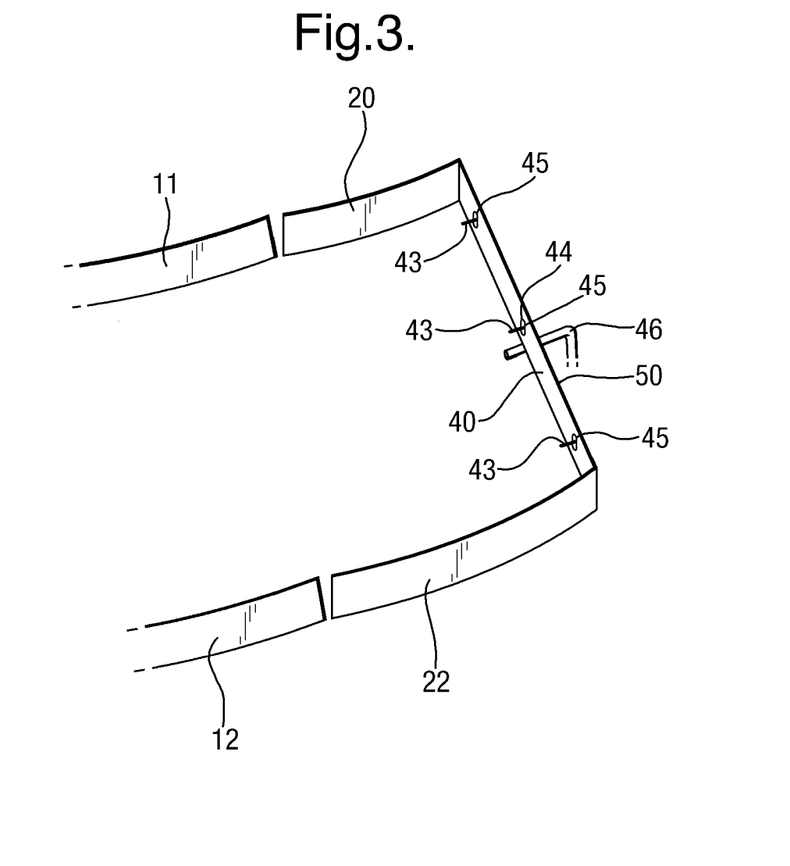
FIGS. 3 and 4 are, respectively, a schematic perspective view and a schematic end view of one of the articulated wings of the gravity bending mould of FIG. 1 showing an auxiliary end rail mounted to an end rail of the articulated wing, the articulated wing and the auxiliary end rail both being in an initial position prior to the bending operation.
Figure 4:
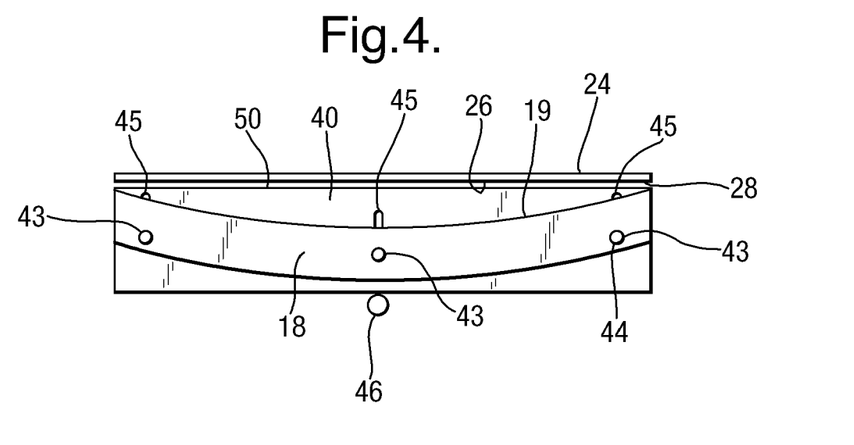
Figure 5:
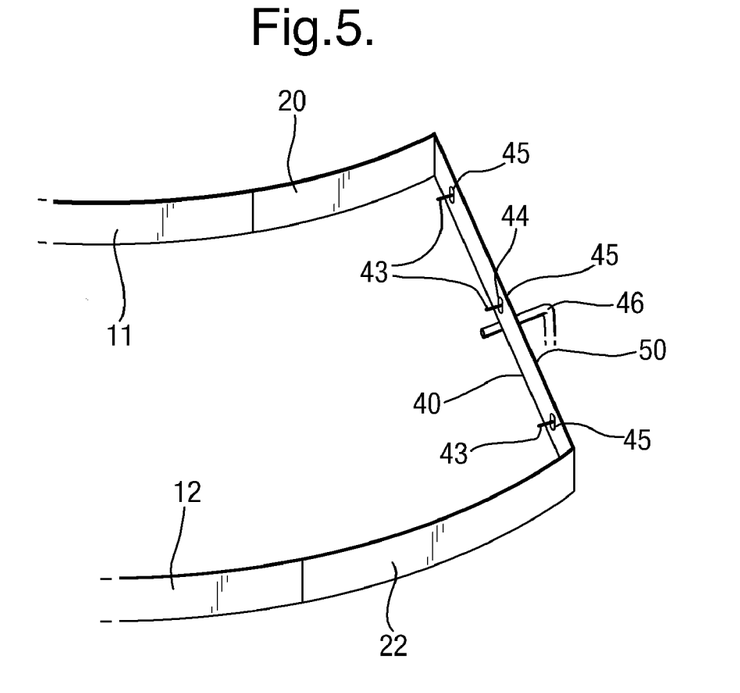
FIGS. 5 and 6 are, respectively, a schematic perspective view and a schematic end view of the articulated wing of FIGS. 3 and 4 showing the articulated wing and the auxiliary end rail in an intermediate position during the bending operation, after completion of a first phase of two successive phases of the bending operation.
Figure 6:
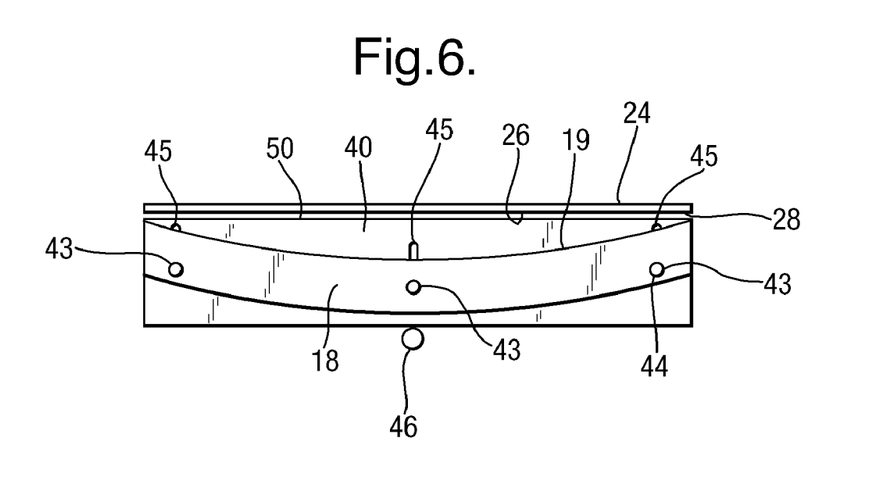
Figure 8:
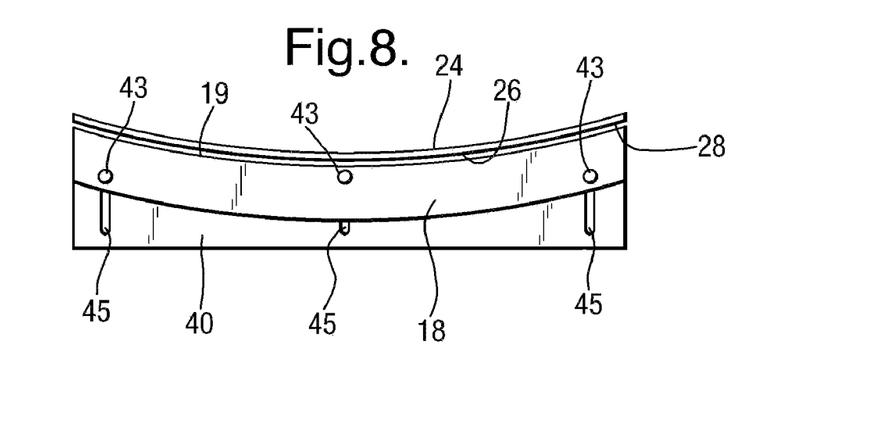

The bending rails 11, 12 of the central portion 4 and the bending rails 14,16 of the two articulated wing portions 6,8 define a peripheral rim 21 which supports the glass sheet or sheets 24 along a peripheral edge 26 of the glass sheet lower surface 28 (the glass sheet 24 is shown in FIGS. 4, 6 and 8). The wing portions 6, 8 are connected to counterweights 30, 32 which apply a rotational force on the wing portions 6, 8, tending to rotate the wing portions 6, 8 upwardly, each about a respective pivot axis X-X defined by pivot mounts 34, 36 on the support 10. In the bending operation, the wing portions 6, 8 are rotated from a substantially horizontal open initial downward position, shown in FIGS. 3 and 4, to a final closed bent upper position, shown in FIG. 1, in which the peripheral rim 21 forms the desired bent shape of the glass sheets 24. The bending rails 11, 12 of the central portion 4 and the bending rails 14, 16 of the two articulated wing portions 6, 8 have a curved upper surface which corresponds to the desired shape of the periphery of the glass sheets 24 so that the curved shape of the entire peripheral rim 21 defines, in the closed configuration of the mould 2, the final desired shape of the windscreen peripheral edge 26.

In accordance with the present invention, an auxiliary end rail 38, 40 is provided on each wing portion 6, 8. The auxiliary end rail 38, 40 is mounted adjacent and substantially parallel to a respective end section 18 of the respective wing portion 6, 8. In accordance with the embodiment illustrated in FIGS. 1 to 8, the auxiliary end rail 38, 40 is mounted to the end section 18 laterally inwardly of the end section 18, by means of a series of spaced slider mounts 42, 44 that are adapted to permit substantially vertical sliding movement of the entire auxiliary end rail 38, 40 with respect to the respective end section 18. Each auxiliary end rail 38, 40 can move between a raised, supported position and a lowered unsupported position relative to the respective end section 18. Each slider mount 42, 44 comprises a substantially horizontal pin 43 fixed to the end section 18 and slidably received in a substantially vertical slot 45 in the respective auxiliary end rail 38, 40.

Such relative sliding motion may sometimes be inhibited by mechanical interference, for example by inadvertent catching or rubbing of insulating material on one or both of the parts, between the respective auxiliary end rail 38, 40 and the respective end section 18 which would inhibit a free dropping action of the auxiliary end rail 38, 40 relative to the respective end section 18 as described in detail hereinafter.

Figure 9:
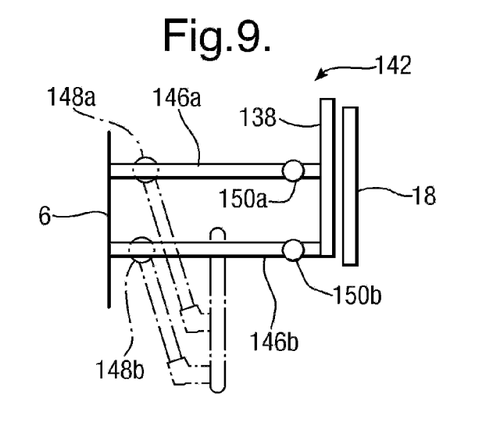
FIG. 9 is a schematic side elevation of an alternative embodiment of the mounting of auxiliary end rail on the articulated wing of the gravity bending mould.

Accordingly, to avoid such mechanical interference, FIG. 9 shows a schematic side elevation of an alternative embodiment of the mounting of auxiliary end rail 138, 140 on the articulated wing portion 6, 8 of the gravity bending mould 2. In this embodiment, the auxiliary end rail 138, 140 is mounted to the end section 18 laterally inwardly of the end section 18, by means of a series of spaced pivot mounts 142 that are adapted to permit substantially arcuate movement of the entire auxiliary end rail 138, 140 with respect to the respective end section 18. The mounts 142 are spaced along each end section 18/auxiliary end rail 138, 140 pair in a manner similar to the mounts 42, 44 of the first embodiment. Each auxiliary end rail 138, 140 can move between a raised, supported position and a lowered unsupported position relative to the respective end section 18. Each pivot mount 142 comprises upper and lower parallel pivot arms 146a, 146b, each pivotally mounted at a respective first pivot 148a, 148b to the respective wing portion 6, 8 and at a respective second pivot 150a, 150b to the respective auxiliary end rail 138, 140. The first pivots 148a, 148b and the second pivots 150a, 150b have substantially horizontal pivot axes. The provision of parallel pivot arms ensures that the auxiliary end rails 138, 140 move smoothly in a defined arc and is maintained in a vertical configuration through the arcuate movement. This ensures that the auxiliary end rails 138, 140 do not inadvertently engage the wing portions during their arcuate downward motion.

When moving from the raised, supported position shown in solid lines in FIG. 9 to the lowered unsupported position shown in phantom in FIG. 9, each pivot arm 146a, 146b rotates downwardly in a first rotational sense (e.g. clockwise in FIG. 9) about the first pivot 148a, 148b and the respective auxiliary end rail 138, 140 rotates about the second pivot 150a, 150b a second opposite rotational sense (e.g. anticlockwise in FIG. 9). This causes the auxiliary end rail 138, 140 to be moved laterally away from the respective end section 18 during the dropping motion. Such lateral movement reduces the possibility of any mechanical interference, for example by inadvertent catching or rubbing of insulating material on one or both of these parts, between the respective auxiliary end rail 138, 140 and the respective end section 18 which would inhibit a free dropping action.

A tripping support mechanism 46 selectively and temporarily supports the auxiliary end rail 38, 40 in a raised position with respect to the respective end section 18. The support mechanism 46 can be temporarily locked in the support position, and can be subsequently released by a latch mechanism 48 connected thereto. The latch mechanism 48 is adapted to release the support for the auxiliary end rail 38, 40 so that the auxiliary end rail 38, 40 drops under the action of gravity from the raised position to a lowered position with respect to the respective end section 18.

In the illustrated embodiment, each auxiliary end rail 38, 40 is automatically pushed upwardly into the raised position with respect to the respective end section 18 and the support mechanism 46 is automatically locked in the support position when the wing portions 6, 8 are opened prior to the loading operation for the flat glass sheets 24.

In the illustrated embodiment, the upper surface 50 of the auxiliary end rail 38, 40 is flat, or at least substantially flat, so that the auxiliary end rail 38, 40 introduces no, or at least substantially no, transverse curvature to the glass sheets 24 during the bending operation. However, some relatively minor degree of curvature may be present in the upper surface 50 of the auxiliary end rail 38, 40.

In the raised position (see FIGS. 3 and 4) the upper surface 50 of the auxiliary end rail 38, 40 is, in a central portion thereof, higher than the upper surface of the respective end section 18, but at the opposed longitudinal ends of the auxiliary end rail 38, 40 the upper surface 50 coincides in height with the upper surface of the respective wing portion 6, 8 at the junction between the end section 18 and the respective side section 20, 22. In contrast, in the lowered position the upper surface 50 of the auxiliary end rail 38, 40 is lower than the upper surface of the respective end section 18.

As is known in the art, a series of bending moulds 2 are provided, each being mounted on a respective carriage 52 which is conveyed, in turn, through a heating lehr 54 of a glass bending furnace 56 by a conveyor system 58.

Figure 10:
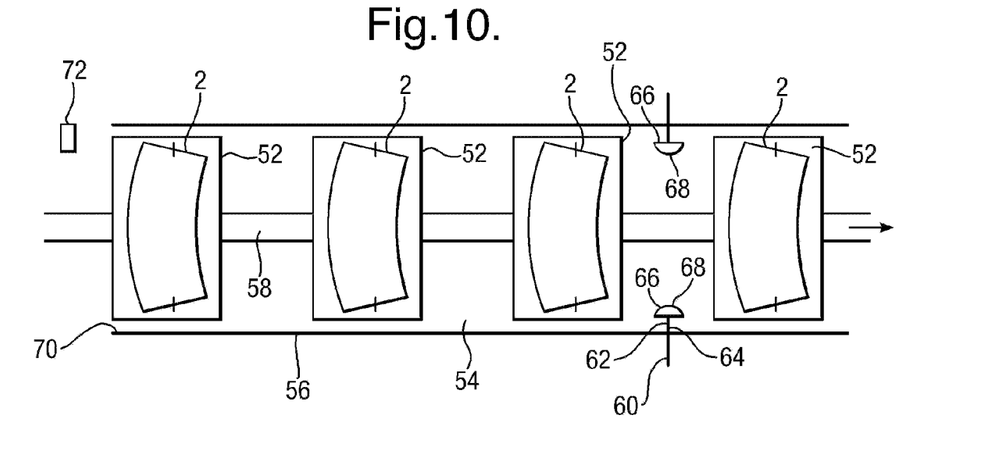
FIG. 10 is a schematic plan view of a plurality of the gravity bending moulds of FIG. 1 passing through a furnace for bending glass sheets in accordance with the present invention.

In accordance with the invention, as shown in FIG. 10 an actuator mechanism 60 is provided in the furnace 56 at a predetermined location along the furnace length. The actuator mechanism 60 is adapted to operate the latch mechanism 48 as the respective bending mould 2 passes thereby. Typically, the actuator mechanism 60 comprises an elongate member 62, such as a metal bar 64 carrying a flange 66 at its end, the flange having an inwardly directed curved cam surface 68. The actuator mechanism 60 pushes the latch mechanism 48 inwardly towards the centre of the furnace 56 as the bending mould 2 is conveyed past the actuator mechanism 60. This causes the support mechanism 46 to be released at a specific point of time in the glass bending operation, which in turn causes the respective auxiliary end rail 38, 40 to drop under the action of gravity from the raised position to a lowered position with respect to the respective end section 18.

In addition, upstream of the furnace entrance 70 is located a priming actuator 72, illustrated schematically in FIG. 10. Before, or after in some embodiments, the glass sheets are loaded onto the bending mould, the priming actuator 72 engages the mould 2 to dispose the auxiliary end rail 38, 40 in the raised position prior to passage of the bending mould 2 through the furnace. This priming actuator 72 primes the bending mould 2 ready for the first phase of the bending operation, whereas the actuator mechanism 60 initiates the commencement of the second phase of the bending operation.

The glass bending operation will now be described.

Initially, the auxiliary end rails 38, 40 are disposed in the raised position and supported in that position by the support mechanism 46. This may be achieved by the priming actuator 72. The wing portions 6, 8 are pushed downwardly to the substantially horizontal open initial position as shown in FIGS. 3 and 4, and the initial planar glass sheet or sheets 24 are placed on the bending mould 2, whereby the glass sheet or sheets 24 are supported horizontally by portions of the peripheral rim 18 in the wing portions 6, 8. Specifically, the opposed longitudinal ends of the glass sheets 24 are supported on the auxiliary end rails 38, 40. Additionally, longitudinally inward parts of the glass sheets 24 are supported by the side sections 20, 22 at points substantially above the pivot mounts 34, 36. The weight of the glass sheets 24 acts against the weight of the counterweights 30, 32, so that the wing portions 6, 8 are maintained in the substantially horizontal open initial position.

The assembly of the glass sheet or sheets 24 on the gravity bending mould 2 is then passed through the heating lehr 54. As the glass heats it softens and progressively sags downwardly under gravity, permitting the articulated wings 6, 8 progressively to be rotated upwardly about their respective pivot axis under action of the counterweights 30, 32, thereby progressively to bend the glass sheet or sheets 24 and close the mould 2.

Figure 1:
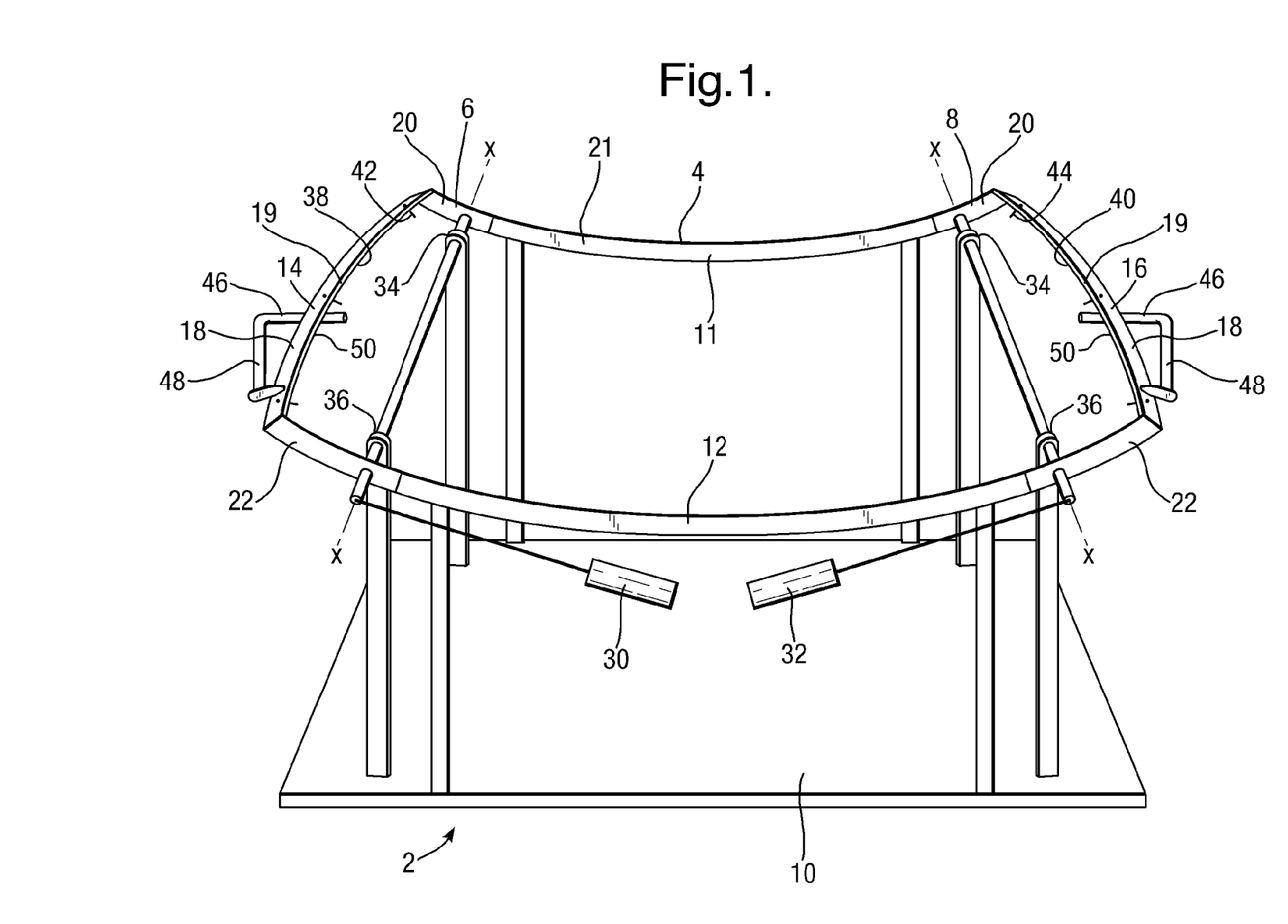
FIG. 1 is a schematic perspective side elevation of a gravity bending mould for bending glass sheets in accordance with an embodiment of the present invention, the gravity bending mould being in a closed, finally bent, configuration.
Figure 2:
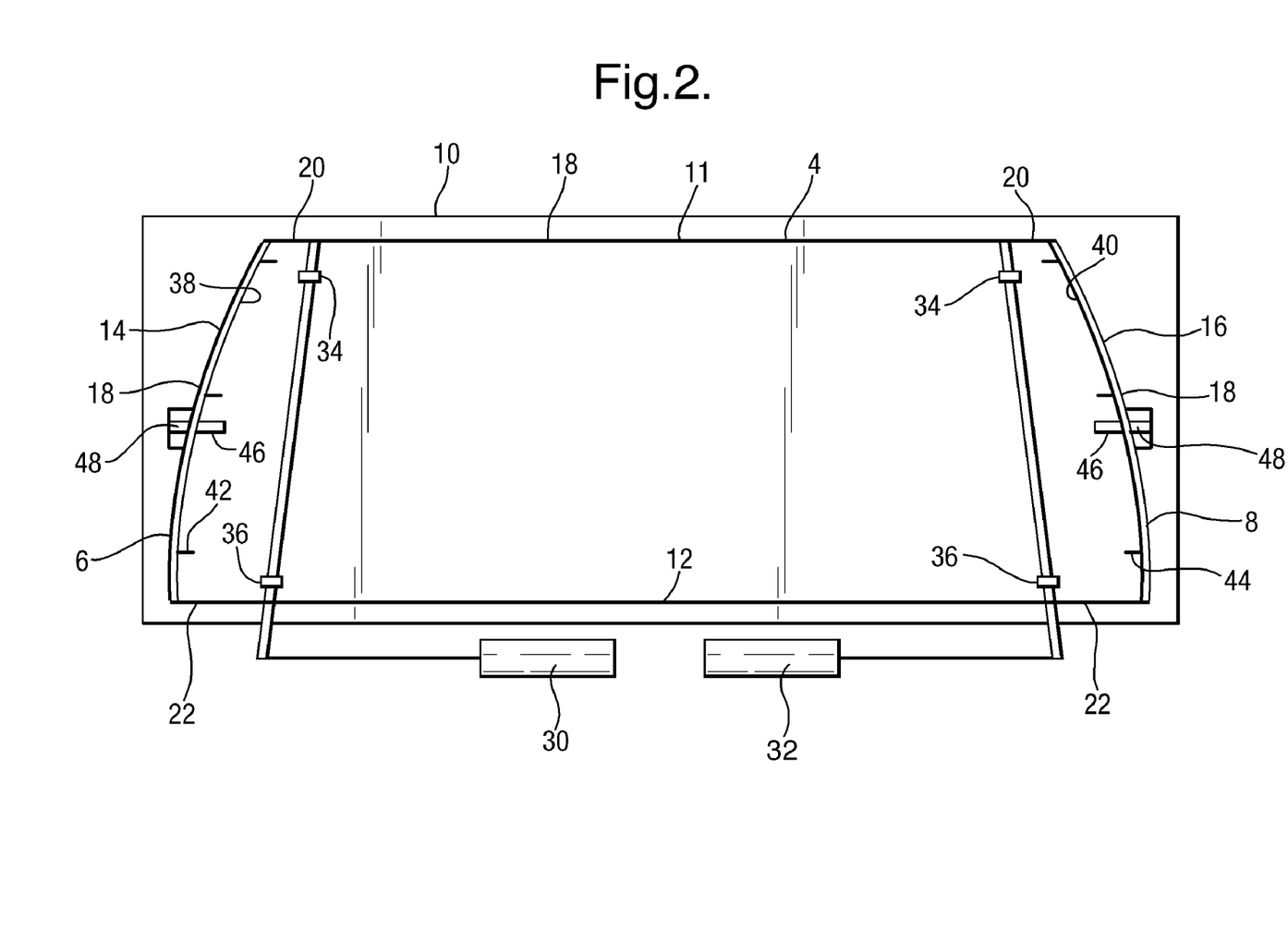
FIG. 2 is a schematic plan view of the gravity bending mould of FIG. 1.

During a first phase of the glass bending operation, the ends of the glass sheet or sheets 24 are supported on the auxiliary end rails 38, 40. Since the upper surfaces 50 of the auxiliary end rails 38, 40 are linearly straight or substantially linearly straight, no, or substantially no, transverse or cross curvature is introduced into the glass sheet or sheets 24 during the first phase of the glass bending operation. During the first phase of the glass bending operation, the two wing portions 6, 8 pivot upwardly hilly to the closed position, as shown in FIG. 1, to provide the necessary longitudinal curvature prior to any movement of the auxiliary end rails 38, 40 relative to the respective end section 18. The glass sheets 24 sag under gravity so as to contact, and be supported by, the peripheral rim 21 around the entire periphery of the glass sheets 24. In this first phase of the glass bending operation, shown in FIGS. 5 and 6, the ends of the glass sheet or sheets 24 are not bent to give any cross curvature because they are supported on the linearly straight horizontal auxiliary end rails 38, 40. Instead, the ends of the glass sheet or sheets 24 remain constantly substantially planar throughout the first phase. This first phase is completed typically at the termination of a bending section of the furnace and at the commencement of an annealing section of the furnace.

Figure 7:
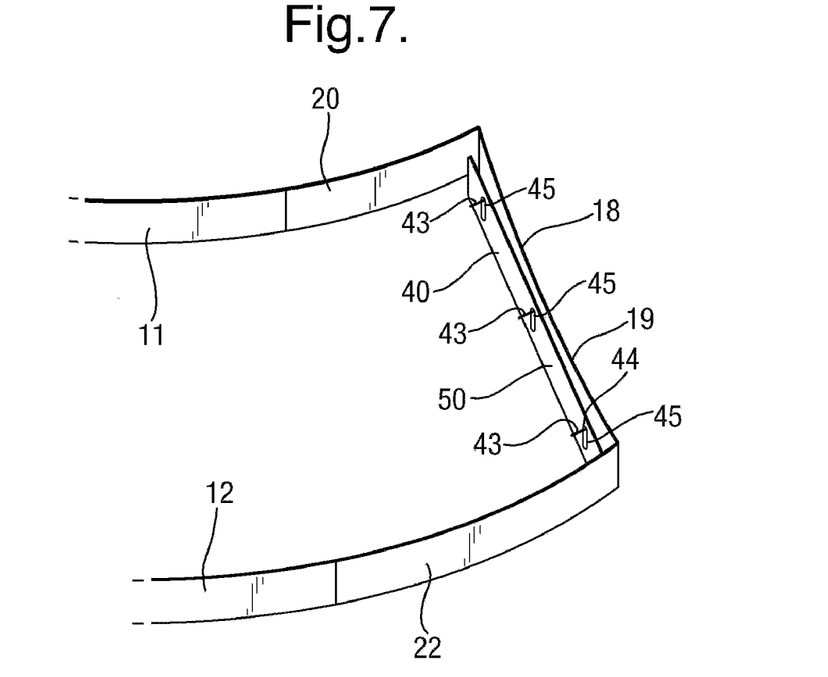
FIGS. 7 and 8 are, respectively, a schematic perspective view and a schematic end view of the articulated wing of FIGS. 3 and 4 showing the articulated wing and the auxiliary end rail in a final position at the end of the bending operation.

After the desired longitudinal curvature has been introduced completely by full closing of the articulated bending mould 2, as shown in FIGS. 7 and 8 in the second phase of the glass bending operation the auxiliary end rails 38, 40 are released by operation of the actuator mechanism 60, external of and separate from the bending mould, which is located in the furnace 56 at the predetermined location along the furnace length. The actuator mechanism 60 operates the latch mechanism 48 as the respective bending mould 2 passes thereby, causing the support mechanism 46 to be released, which in turn causes the respective auxiliary end rail 38, 40 to drop under the action of gravity from the raised position to the lowered position with respect to the respective end section 18. This enables the glazing ends to be bent to the desired cross curvature defined by the shape of the end sections 18 only after the longitudinal shaping has been completed. The glazing ends sag into contact with the end sections 18. This completes the bending operation. The mould 2 and bent glass thereon pass through the remainder of the furnace, undergoing a conventional annealing and cooling schedule. After the bending mould 2 exits the furnace, the bent glass sheets 24 are removed from the bending mould 2 and allowed to cool. The bending mould 2 is returned to the entrance of the furnace, primed e.g. by a priming actuator, and loaded with flat glass sheets in a subsequent glass bending cycle.

Although the illustrated embodiment shows a gravity bending mould for bending glass sheets to form a windscreen, having symmetric wing portion on opposite ends of a central portion, it will be apparent to those skilled in the art that other gravity bending mould configurations may be employed in accordance with the present invention. For example, only a single wing may be provided, or alternatively the opposed wings may not be symmetrical. In addition, the or each wing may have only two sides, as opposed to three sides (to form the U-shape) as shown in the illustrated embodiment. Yet further, the auxiliary rail, and its adjacent end rail of the wing portion, may be inclined to the longitudinal direction of the gravity bending mould. Also, the auxiliary end rail may be mounted to the end section laterally outwardly of the end section.

In the illustrated embodiment, the auxiliary rail drops under the action of gravity when released so as to commence the second phase of the bending operation. However, the present invention may alternatively employ an auxiliary rail having a fixed vertical position, and instead the final ring (or an articulated wing thereof) may be configured to move upwardly with respect to the auxiliary rail. In either case, there is relative vertical motion between the auxiliary rail and the adjacent peripheral rail going from the first phase to the second phase of the bending operation, and the raised adjacent peripheral rail takes over the bending operation from the lowered auxiliary rail In accordance with the present invention, all of the longitudinal curvature is introduced into the glass sheets prior to any (or substantially any) cross curvature being introduced. The two bending steps, longitudinal bending and cross (transverse) bending, are separate. This separation, and the initiation of the second phase, is readily controlled within the furnace by use of an actuator external of the mould to trip the latch mechanism to release the auxiliary end rails at a precise period within the bending operation. This provides the technical advantage of greater control over the bending operation, but still using a simple bending mould structure.

The present invention has particular application in the manufacture of vehicle windscreens for which a high degree of curvature is desired to be introduced into the edges or corners of the glass sheets.

The embodiments of the present invention provide the technical advantage that a separation of the glass bending in the longitudinal and cross (transverse) directions is achieved. This can enhance the optical quality of the bent glass sheets and of vehicle glazing produced therefrom. In particular, by completing the longitudinal bending before commencing the cross bending, kinks and inverse curvature, the latter resulting from reverse bending, can be substantially eliminated, in particular from regions of high curvature. Furthermore, the problem of inadvertent lift of the lower glass surface from the peripheral rim can be avoided. In summary, these benefits permit the production of glass sheets of high curvature with enhanced properties.

Yet further, these enhanced properties can be achieved using a low cost mould in a readily controllable production, and at a high production rate.

Figure 11:
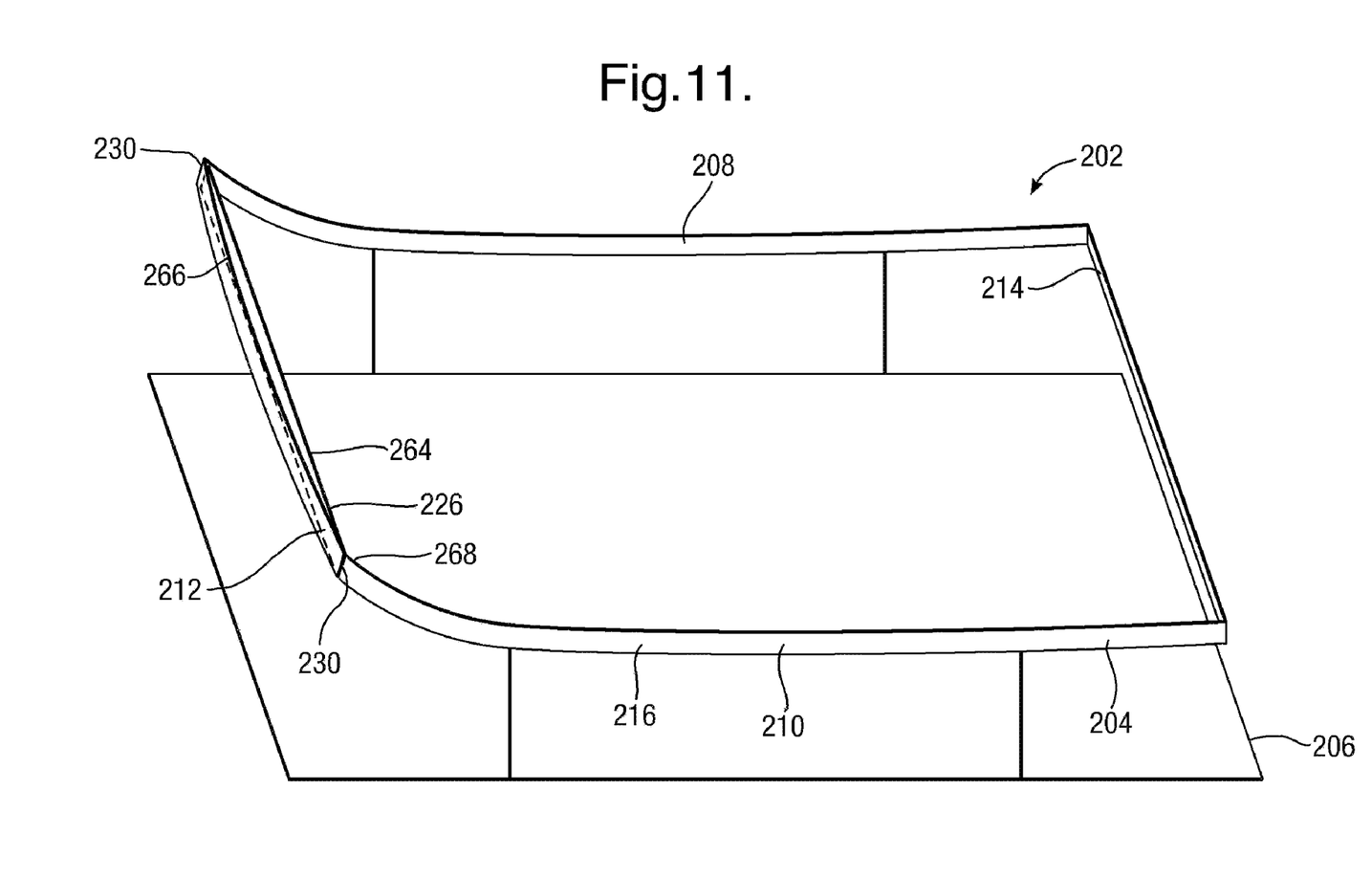
FIG. 11 is a schematic perspective side elevation of a gravity bending mould for bending glass sheets to form a panoramic or moon roof in accordance with an other embodiment of the present invention, the gravity bending mould being in an initial open configuration.
Figure 12:
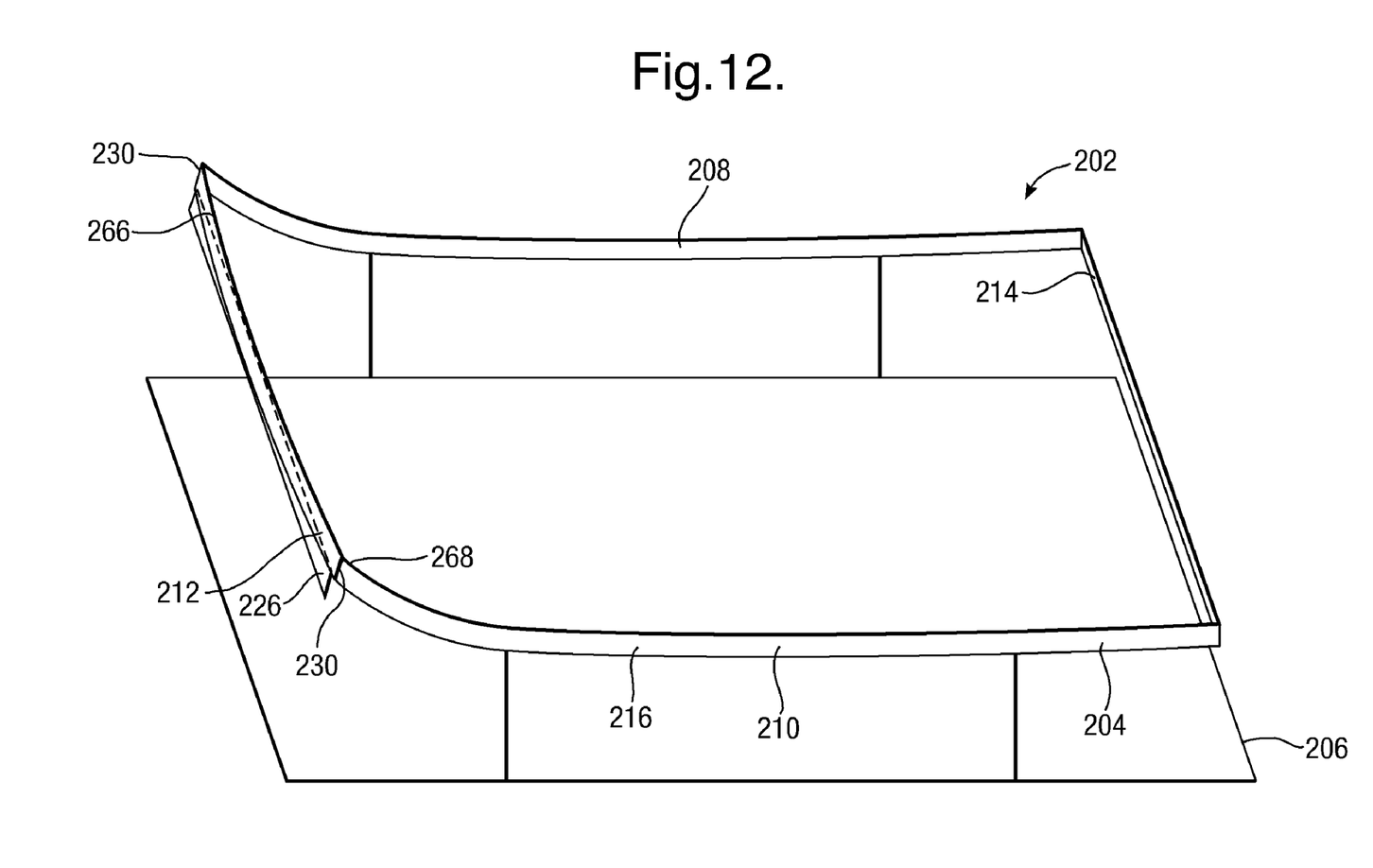
FIG. 12 is a schematic perspective side elevation of the gravity bending mould of FIG. 11 in a closed, finally bent, configuration.

Referring to FIGS. 11 and 12 of the drawings, there is shown a gravity bending mould 202 for bending glass sheets in accordance with a further embodiment of the present invention. The gravity bending mould 202 comprises a peripheral fixed shaping rail 204 mounted on a support 206. The peripheral fixed shaping rail 204 has two opposed side shaping rails 208, 210 that are substantially parallel and substantially horizontal, and configured to shape the two longitudinal edges of a panoramic or moon roof of an automobile. The peripheral fixed shaping rail 204 also has two opposed end shaping rails 212, 214. The two end shaping rails 212, 214 are configured respectively to shape a front and a rear transverse edge of a panoramic or moon roof of an automobile.

The shaping rails 208, 210, 212, 214 define a peripheral rim 216 which supports the glass sheet or sheets (not shown) along a peripheral edge of the glass sheet lower surface. The peripheral rim 216 forms the desired final bent shape of the glass sheets.

In accordance with the present invention, at least one auxiliary rail 226 is provided on the peripheral fixed shaping rail 204. The auxiliary rail 226 is mounted adjacent and substantially parallel to the end shaping rail 212, and extends as far as the two opposed corners 230 of the peripheral fixed shaping rail 204 each located at a junction between the end shaping rail 212, configured to shape a front transverse edge of a panoramic or moon roof of an automobile, and a respective side shaping rail 208, 210.

In accordance with the embodiment illustrated in FIGS. 11 and 12, the auxiliary rail 226 is mounted to the peripheral fixed shaping rail 204 laterally inwardly of the peripheral fixed shaping rail 204, by means of a series of spaced slider mounts (not shown) that, as in the previous embodiments, are adapted to permit substantially vertical sliding movement of the entire auxiliary rail 226 with respect to the end shaping rail 212. The auxiliary rail 226 can move between a raised, supported position and a lowered unsupported position.

As in the previous embodiments, a support mechanism selectively and temporarily supports the auxiliary rail 226 in a raised position, can be temporarily locked in the support position, and can be subsequently released by a latch mechanism connected thereto, which is adapted to release the support for the auxiliary rail 226 so that the auxiliary rail 226 drops under the action of gravity from the raised position to a lowered position. Alternatively, the remainder of the mould may be caused to rise relative to the auxiliary rail 226.

In the illustrated embodiment, the upper surface 264 of the auxiliary rail 226 is flat, or at least substantially flat, so that the auxiliary rail 226 introduces no, or at least substantially no, curvature to the glass sheets during the bending operation. However, some relatively minor degree of curvature may be present in the upper surface 264 of the auxiliary rail 226.

In the raised position (see FIG. 11) the upper surface 264 of the auxiliary rail 226 is higher than the upper surface 266 of the end shaping rail 212 except at the corners 230 at which the upper surface 264 of the opposed longitudinal ends of the auxiliary rail 226 coincides in height with the upper surface 268 of the peripheral fixed shaping rail 204. In contrast, in the lowered position (see FIG. 12) the upper surface 264 of the auxiliary rail 226 is lower than the upper surface 266 of the end shaping rail 212.

The glass sheets on the mould are subjected to a two phase bending operation as described with respect to the first embodiment.

After the first phase of the glass bending operation, the front transverse edge of the glass sheet or sheets are not bent to give any curvature because they are supported on the at least one linearly straight auxiliary rail 226.

In the second phase of the glass bending operation the auxiliary rail 226 is released and drops under the action of gravity from the raised position to the lowered position with respect to the end shaping rail 212. This enables the front transverse edge of the glass sheet or sheets, in particular at the corners, to be bent to the desired higher curvature defined by the shape of the peripheral rim 216 only after the lower curvature shaping for the remainder of the glass sheet or sheets has been completed. This completes the bending operation.

Although the illustrated embodiment shows a gravity bending mould for bending glass sheets to form a panoramic or moon roof having auxiliary rails on one end thereof, it will be apparent to those skilled in the art that other gravity bending mould configurations may be employed in accordance with the present invention. For example, auxiliary rails may be disposed on the opposed mould ends. Yet further, the auxiliary rail, and its adjacent end rail of the wing portion, may be disposed along only one side or around one or more corners of the gravity bending mould. Also, the auxiliary rail may be mounted to the peripheral fixed shaping rail laterally outwardly of the peripheral fixed shaping rail.

In accordance with the preferred embodiments of the present invention, all of the low degree (i.e. large radius) curvature is introduced into substantially all of the area and edge of the glass sheets prior to any (or substantially any) high degree (i.e. small radius) curvature being introduced into corners of the glazing to form the panoramic or moon roof. The two bending steps, large radius in the body and small radius at the corners, are separate. This separation, and the initiation of the second phase, is readily controlled within the furnace by use of an actuator external of the mould to trip the latch mechanism to release the auxiliary rail or rails at a precise period within the bending operation. This provides the technical advantage of greater control over the bending operation, but still using a simple fixed bending mould structure.

The present invention has particular application in the manufacture of vehicle panoramic or moon roofs for which a high degree of curvature is desired to be introduced into the corners of the glass sheets with great accuracy.

The embodiments of the present invention provide the technical advantage that a separation of the glass bending in the body and corners of the glass sheets is achieved. This can enhance the optical quality of the bent glass sheets and of vehicle glazing produced therefrom. In particular, by completing the bulk, large radius, bending before commencing the corner, small radius, bending, kinks and inverse curvature, the latter resulting from reverse bending, in the high curvature corners can be substantially eliminated. Since the peripheral edges of a panoramic or moon roof are provided with an obscuration band, these edges are not transmitting to visible light, but rather are reflective. Such reflective properties tend to enhance the negative visual impact of incorrect curvature at the peripheral edges. Also, the most curved parts of a panoramic or moon roof, being located above the upper corners of the windscreen, are highly visible, being approximately at eye level and highly exposed to light. This also exacerbates any negative visual impact of any incorrectly shaped glazing in those regions. In accordance with the invention, these problems can be overcome by avoiding the formation of incorrectly curved, flat or inversely curved regions in the vicinity of the corners of a panoramic or moon roof.

Furthermore, the problem of inadvertent lift of the lower glass surface from the peripheral rim can be avoided. In summary, these benefits permit the production of glass sheets of high curvature with enhanced properties.

Yet further, these enhanced properties can be achieved using a low cost mould in a readily controllable production, and at a high production rate.

The invention claimed is:

1. A gravity bending mould for bending glass sheets, the gravity bending mould comprising a peripheral shaping rail, the peripheral shaping rail having at least one end portion including a respective end section, and at least one auxiliary rail supported by the at least one end portion of the peripheral shaping rail, the or each auxiliary rail being respectively mounted adjacent to at least a portion of the respective end section by at least one mount that is adapted to permit relative vertical movement of the auxiliary rail with respect to the respective end section, a tripping mechanism for selectively and temporarily disposing the auxiliary rail in a raised position with respect to the respective end section, and a latch mechanism connected to the tripping mechanism, the latch mechanism being adapted to be engaged by an external actuator to cause relative vertical movement of the auxiliary rail with respect to the respective end section, by operation of the tripping mechanism, so that the auxiliary rail is subsequently disposed in a lowered position with respect to the respective end section.

2. A gravity bending mould according to claim 1 wherein the peripheral shaping rail comprises a fixed portion having at least one fixed shaping rail, and the at least one end portion is an articulated end portion mounted at a respective end of the fixed portion, the or each end portion having a respective movable shaping rail including the respective end section.

3. A gravity bending mould according to claim 1 wherein the peripheral shaping rail comprises a fixed portion having at least one fixed shaping rail, and the at least one end portion is a fixed end portion mounted at a respective end of the fixed portion, the or each end portion having a respective fixed shaping rail including the respective end section.

4. A gravity bending mould according to claim 1 wherein the or each auxiliary rail is adapted to drop downwardly under the action of gravity from the raised position to a lowered position with respect to the respective end section of the respective shaping rail when the latch mechanism is engaged by the external actuator to cause relative vertical movement of the auxiliary rail with respect to the respective end section.

5. A gravity bending mould according to claim 1 wherein at least the or each end section of the peripheral shaping rail is adapted to move upwardly from a lowered position to a raised position so that the or each end section is raised above the respective auxiliary rail when the latch mechanism is engaged by the external actuator to cause relative vertical movement of the auxiliary rail with respect to the respective end section.

6. A gravity bending mould according to claim 1 wherein an upper shaping surface of the auxiliary rail is substantially flat.

7. A gravity bending mould according to claim 6 wherein in the raised position the upper surface of the auxiliary rail, is, in a central portion thereof, higher than the upper surface of the respective end section, and at the opposed longitudinal ends of the auxiliary rail the upper surface of the auxiliary rail substantially coincides in height with the upper surface of the adjacent peripheral shaping rail.

8. A gravity bending mould according to claim 1 wherein the auxiliary rail is mounted inwardly of the respective adjacent peripheral shaping rail.

9. A gravity bending mould according to claim 1 wherein the auxiliary rail and the mounts are constructed whereby the entire auxiliary rail slides vertically between the raised and lowered positions.

10. A gravity bending mould according to claim 1 wherein the auxiliary rail and the mounts are constructed whereby the auxiliary rail and the respective adjacent peripheral shaping rail are moved laterally relative to each other during relative vertical motion between the raised and lowered positions.

11. A glass sheet bending apparatus, the apparatus comprising a plurality of gravity bending moulds according to claim 1, a furnace, and a conveyor system for successively conveying the plurality of gravity bending moulds through the furnace, the furnace including at least one latch actuator mechanism provided in the furnace at a predetermined location along the furnace length, the latch actuator mechanism being adapted to operate the latch mechanism as each respective gravity bending mould is conveyed past the latch actuator mechanism.

12. A glass sheet bending apparatus according to claim 11 wherein the furnace further includes at least one priming actuator mechanism provided outside the furnace at a predetermined location, the priming actuator mechanism being adapted to operate the tripping mechanism as each respective gravity bending mould is conveyed past the priming actuator mechanism.

13. A method of gravity bending glass sheets, the method comprising;
 (a) providing a gravity bending mould comprising a peripheral shaping rail, the peripheral shaping rail having at least one end section;
 (b) placing at least one flat glass sheet on the gravity bending mould; and
 (c) gravity bending the at least one flat glass sheet in a furnace by heating the at least one glass sheet during conveyance through the furnace, the heating causing softening of the at least one glass sheet thereby to gravity bend the at least one glass sheet onto the peripheral shaping rail to a final position corresponding to the desired bent shape of the at least one glass sheet, the gravity bending comprising two phases,
  (i) a first phase in which substantially all of the longitudinal curvature is introduced by gravity bending the at least one glass sheet and at least one lateral edge of the at least one glass sheet is supported and substantially prevented from developing a cross curvature by gravity bending; and
  (ii) a second phase, after the first phase, in which the at least one lateral edge of the at least one glass sheet is permitted to develop a final cross curvature by gravity bending,
 wherein in the first phase the at least one lateral edge of the at least one glass sheet is supported by an auxiliary rail supported by the at least one end section of the peripheral shaping rail, an upper surface of the auxiliary rail being supported above an adjacent upper surface of the peripheral shaping rail, and in the second phase the auxiliary rail is disposed below the peripheral shaping rail to permit the at least one lateral edge of the at least one glass sheet to gravity bend into contact with the adjacent upper surface of the peripheral shaping rail.

14. A method according to claim 13 wherein in the first phase the at least one lateral edge of the at least one glass sheet is supported substantially flat by the auxiliary rail, the upper surface of the auxiliary rail being substantially flat.

15. A method according to claim 13 wherein the entire auxiliary rail is adapted to be disposed below the respective adjacent peripheral shaping rail in the second phase.

16. A method according to claim 15 wherein the auxiliary rail and the respective adjacent peripheral shaping rail are moved laterally away from each other in the second phase as compared to the first phase.

17. A method according to claim 13 wherein a tripping mechanism selectively and temporarily disposes the auxiliary rail in a raised position with respect to the respective peripheral shaping rail, and a latch mechanism connected to the tripping mechanism is adapted to be engaged by an external tripping actuator to cause relative vertical movement of the auxiliary rail with respect to the respective peripheral shaping rail going from the first phase to the second phase.

18. A method according to claim 17 wherein the mould is conveyed by a conveyor system through the furnace during the gravity bending step to cause gravity bending and the external tripping actuator is located at a particular location in the furnace.

19. A gravity bending mould for bending glass sheets for the manufacture of panoramic roofs for automobiles, the gravity bending mould comprising a peripheral fixed shaping rail, the shaping rail having at least one corner, and at least one auxiliary rail supported by at least one end portion of the peripheral fixed shaping rail, the or each auxiliary rail being respectively mounted adjacent to at least a portion of a respective corner by at least one mount that is adapted to permit relative vertical movement of the auxiliary rail with respect to the respective corner, a tripping mechanism for selectively and temporarily disposing the auxiliary rail in a raised position with respect to the respective corner, and a latch mechanism connected to the tripping mechanism, the latch mechanism being adapted to be engaged by an external actuator to cause relative vertical movement of the auxiliary rail with respect to the respective corner, by operation of the tripping mechanism, so that the auxiliary rail is subsequently disposed in a lowered position with respect to the respective corner.

20. A glass sheet bending apparatus, the apparatus comprising:
 a plurality of gravity bending moulds, each gravity bending mould comprising a peripheral shaping rail, the peripheral shaping rail having at least one end section, and at least one auxiliary rail mounted on the peripheral shaping rail, the or each auxiliary rail being respectively mounted adjacent to at least a portion of a respective end section by at least one mount that is adapted to permit relative vertical movement of the auxiliary rail with respect to the respective end section, a tripping mechanism for selectively and temporarily disposing the auxiliary rail in a raised position with respect to the respective end section, and a latch mechanism connected to the tripping mechanism, the latch mechanism being adapted to be engaged by an external actuator to cause relative vertical movement of the auxiliary rail with respect to the respective end section, by operation of the tripping mechanism, so that the auxiliary rail is subsequently disposed in a lowered position with respect to the respective end section;

a furnace; and a conveyor system for successively conveying the plurality of gravity bending moulds through the furnace, wherein the furnace includes at least one latch actuator mechanism provided in the furnace at a predetermined location along the furnace length, the latch actuator mechanism being adapted to operate the latch mechanism as each respective gravity bending mould is conveyed past the latch actuator mechanism.

21. A glass sheet bending apparatus according to claim 20 wherein the furnace further includes at least one priming actuator mechanism provided outside the furnace at a predetermined location, the priming actuator mechanism being adapted to operate the tripping mechanism as each respective gravity bending mould is conveyed past the priming actuator mechanism.

* * * * *